United States Patent [19]

Poncet

[11] 4,132,259
[45] Jan. 2, 1979

[54] AUTOMATIC CONTROL OF THE LEVEL OF A MOLTEN METAL BATH

[76] Inventor: Pierre Poncet, 12 bis, rue Trarieux, Lyon, France

[21] Appl. No.: 820,484

[22] Filed: Jul. 29, 1977

[30] Foreign Application Priority Data

Aug. 12, 1976 [FR] France .................. 76 25267

[51] Int. Cl.$^2$ ........................... B22D 11/16
[52] U.S. Cl. ......................... 164/4; 164/449
[58] Field of Search ............. 164/154, 155, 156, 4, 164/449, 450; 73/290 R

[56] References Cited

U.S. PATENT DOCUMENTS

| 3,459,949 | 8/1969 | Poncet | 164/449 |
| 3,886,991 | 6/1975 | Meier | 164/4 |

FOREIGN PATENT DOCUMENTS

| 7439963 | 6/1976 | France | 164/449 |

Primary Examiner—Francis S. Husar
Assistant Examiner—K. Y. Lin
Attorney, Agent, or Firm—Dowell & Dowell

[57] ABSTRACT

In the continuous casting of metals by means of a water-cooled tubular mold into which the molten metal is fed by means of a refractory pouring nozzle which opens in the molten metal bath below a supernatant protective layer of fusible slag, automatic control of the molten bath level is obtained by forming an image of the upper portion of the mold with the pouring nozzle and the slag layer by means of an optical instrument, by disposing a plurality of photo-electric cells on this image along a line substantially coincident with the axis of the nozzle on the said image, some of said cells being on the image of said nozzle and others on the image of the slag layer, by determining the radiation gradient between the successive cells along said line, by taking as the analog of the level of the molten metal bath within the mold the zone of said line where said gradient reverses and by deducing a controlling signal from the position of said zone along said line. The successive cells may be connected two by two to comparators which emit an output in correspondence with the sign of the difference between the responses of the cells of each pair, these outputs being totalized algebraically to deduce the controlling signal.

9 Claims, 6 Drawing Figures

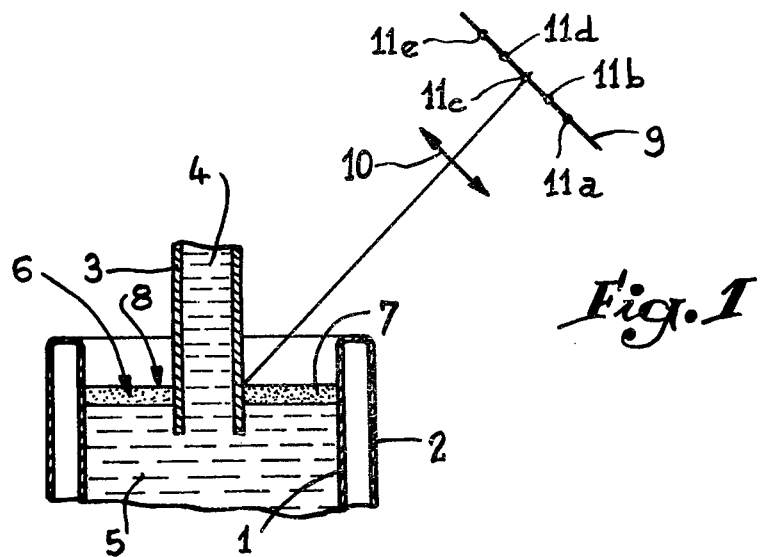
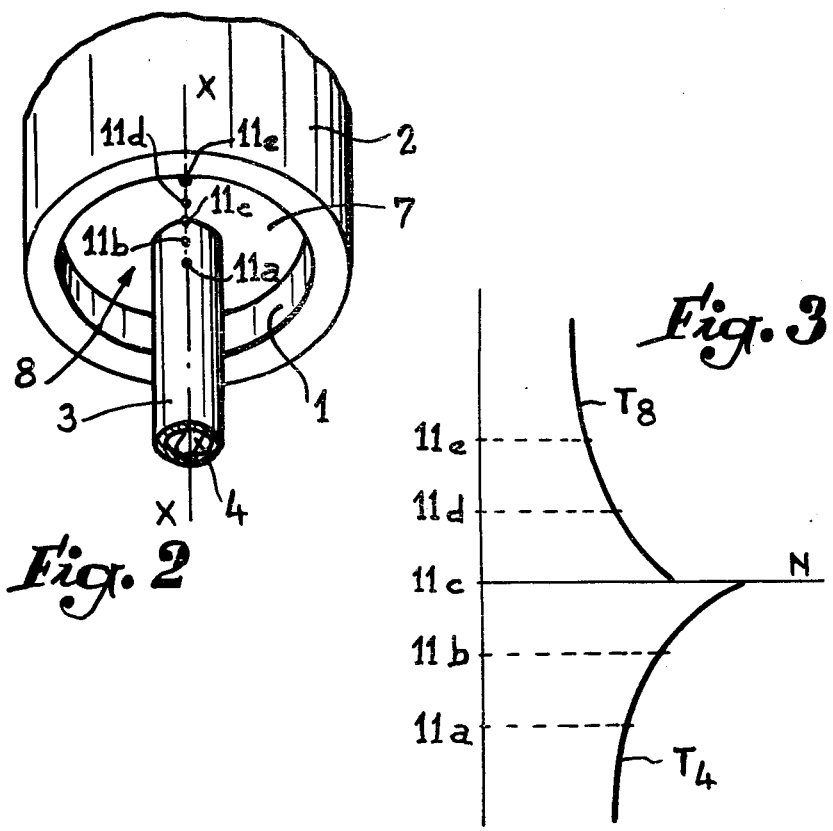

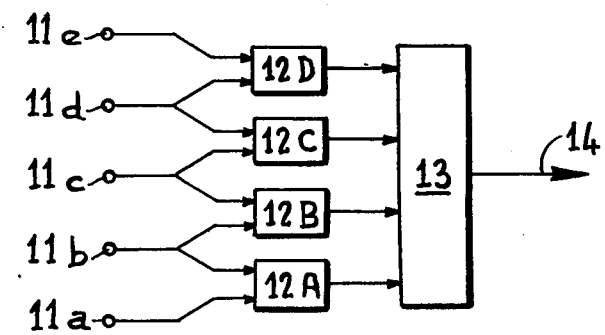
Fig. 4
| CELLS | COMPA-RATORS | OUTPUTS OF THE COMPARATORS FOR A LEVEL WICH IS | | | | |
|---|---|---|---|---|---|---|
| | | CORRECT | SOMEWHAT HIGH | VERY HIGH | SOMEWHAT LOW | VERY LOW |
| 11 e | 12 D | − | − | − | − | + |
| 11 d | 12 C | − | − | − | + | + |
| 11 c | 12 B | + | − | − | + | + |
| 11 b | 12 A | + | + | − | + | + |
| 11 a | | | | | | |
| SIGNAL 14 | | 0 | −2 V | −4 V | +2 V | +4 V |
Fig. 5
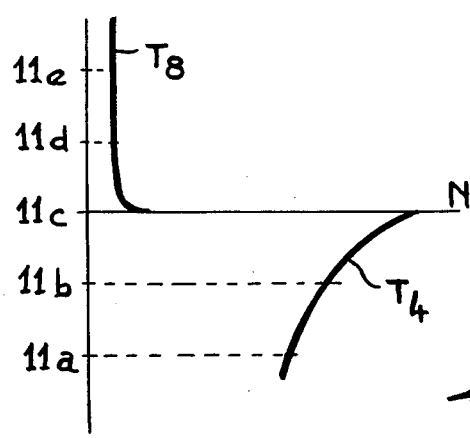
Fig. 6

AUTOMATIC CONTROL OF THE LEVEL OF A MOLTEN METAL BATH

This invention relates to the automatic control of the level of molten metal in continuous casting moulds.

In my prior U.S. Pat. No. 3,459,949 I have disclosed a method wherein an optical instrument such a lens unit is disposed at an angle to the axis of the mould and above the latter so as to form an image of the surface of the molten liquid bath within the said mould, photoelectric cells being placed in the plane of this image to detect its displacements consecutive to the variations of the level of the said surface and to transduce these displacements into electric signals which are used to control the continuous casting process, as for instance by acting on the supply of molten metal to the mould. This method is generally quite satisfactory when the surface of the molten metal remains exposed but difficulties appear when on the contrary a pulverulent product is intermittently introduced into the mould to form a supernatant protective slag layer on the said surface, since this product is initially nonincandescent and therefore forms a black screen on the molten metal.

In my French Pat. No. 74 39963 I have proposed to eliminate this difficulty by providing two groups of cells, the first one following the level of the slag layer laterally with respect to the refractory pouring nozzle which must be used in such a case to introduce the molten metal into the mould below the slag layer (in order to avoid entrainment of slag particles into the bath), while the second one observes this same level in the vertical plane of the said nozzle. By properly combining the responses of the two groups of cells it is possible to obtain a signal which is practically independent of the temperature of the slag layer. But such a method requires a large number of electronic circuits and its operation may be perturbed when the slag heats up irregularly.

It is the object of the present invention to avoid these inconveniences.

In accordance with this invention, in a method for the automatic control of the level of the molten metal bath in a continuous casting mould by means of a refractory pouring nozzle which extends downwardly into the bath below a supernatant protective slag layer, by means of an optical instrument situated above the mould with its axis at an angle to the vertical to form an optical image of the upper portion of the said mould with the nozzle and the slag layer, photo-electric cells being disposed on this image to obtain a controlling signal in accordance with the position of the said level within the mould, the cells are disposed in a line substantially along the axis of the image of the said nozzle, in such manner that some of them receive the radiation from the periphery of the said nozzle and other the radiation from the surface of the said slag layer, the responses of the said cells are combined to determine the direction of the gradient of radiation along the said line, the zone of the said line where the said gradient reverses is selected as the analog of the said level, and the controlling signal is deduced from the position of the said zone along the said line.

In the accompanying drawings:

FIG. 1 is a diagrammatical longitudinal section of the upper portion of a continuous casting mould associated with a pouring nozzle which opens below the protective slag layer.

FIG. 2 shows the corresponding optical image, this view indicating the points of the said image wherein the photo-electric cells are disposed.

FIG. 3 illustrates the temperature gradient as detected by the cells.

FIG. 4 is a block diagram of the circuitry used to derive a controlling signal from the responses of the cells.

FIG. 5 is a table showing the possible variations of this signal.

FIG. 6 is a diagram similar to the diagram of FIG. 3, but corresponding to the short initial period which follows the addition of the pulverulent product on the molten metal bath to produce the slag layer.

In FIG. 1 reference numeral 1 designates a continuous casting mould of conventional construction, for instance made of copper with a cooling jacket 2. A refractory tubular pouring nozzle 3, generally made of quartz, extends vertically into mould 1 to supply a jet 4 of molten steel. The molten metal thus forms within the mould a liquid bath 5 which solidifies progressively into a solid bar, the latter being continuously withdrawn through the lower end (not shown) of the mould in the usual manner. Reference numeral 6 designates the surface of the liquid bath 5, this surface being normally situated above the lower end of nozzle 3 as shown. Surface 6 is covered by a layer 7 of a fusible slag which protects the metal from oxidation. This liquid slag further acts as a lubricant between the molten metal and the inner wall of mould 1. It is therefore necessary to renew it from time to time by pouring into the mould an appropriate pulverulent product. For proper operation the molten metal surface 6 should be maintained at a predetermined level within mould 1 and this is obtained by acting either on the flow rate of jet 4 through nozzle 3, or on the speed at which the solidified bar is extracted from the mould. In order to realize an automatic control, the problem is to detect the level of the surface 6 of the molten metal bath, or since surface 6 is not visible, the level of the surface 8 of the slag layer 7 the thickness of which always remains relatively reduced. But the superficial temperature of layer 7 varies considerably between the pouring of the cold pulverulent product and the time at which the molten slag layer has wholly heated up to a substantially constant (constant meaning here "which no more varies for each point under consideration", and not "uniform on the whole surface") temperature. It is therefore practically impossible to detect directly and continuously the level of surface 8 by means of a photo-electric cell.

In accordance with the present invention an optical image 9 of the upper portion of the mould is realized as for instance by means of a lens unit 10 disposed above mould 1 and laterally with respect thereto. Such an image appears as indicated in FIG. 2. A number of photo-electric cells 11a to 11e are disposed in line on this image 9 along the axis X-X of nozzle 3 (or more exactly of the image of the said nozzle), or close to this axis, in such manner that under normal conditions (i. e., when surface 8 is at the proper level), these cells are equally distributed on the slag layer (surface 8) and on the nozzle. In the case illustrated wherein five cells are provided, two 11a and 11b are situated on the nozzle, one 11c is disposed on the line (or zone) of junction of nozzle 3 and of surface 8, and the remaining two 11d and 11e on the said surface 8. Of course if the number of the cells were even, one half of them would be disposed on the nozzle and the other half on the slag layer surface. In actual practice it is of advantage to provide about ten cells in order to obtain a more progressive control.

FIG. 3 shows the individual responses of the cells 11a-11e assuming that the slag layer 7 has reached a substantially constant temperature, as this occurs most of the time. The ordinates correspond to the positions of the cells along the axis X—X of FIG. 2 and the abscissae to the temperatures. The responses increase from 11a to 11c and then decrease from 11c to 11e. They correspond to two curves of temperature (or radiation) gradient, respectively T4 (nozzle temperature) and T8 (slag temperature). The horizontal line N represents the line of junction on which cell 11c should normally be situated. It may be considered as the analogic representation of the level within the mould. The progressive character of curve T8 results from the fact that the slag is a poor heat conductor, that its central portion is strongly heated by the pouring nozzle 3 while its periphery is strongly cooled by the mould. As to T4, although the temperature of the steel jet 4 is substantially constant, the outer periphery of the nozzle, made of a relatively heat-insulating material, is cooled by ambient air above the mould, this cooling effect decreasing in the vicinity of the upper end of the said mould.

When the level of the molten metal varies within the mould, line N is displaced upwardly or downwardly in FIG. 3 with respect to the cells and it approaches cell 11b or 11d one of which now emits the strongest signal. This displacement of the maximum may be easily detected by electronic means and a controlling signal may be deduced therefrom to act on the continuous casting plant in the proper direction. The acccuracy of this level controlling operation only depends on the spacing apart of the cells on the optical image.

FIG. 4 indicates by way of example how the controlling signal may be deduced from the responses of the cells. In this embodiment the five successive cells 11a to 11e form four successive pairs, each intermediate cell 11b, 11c, 11d being the second one of a pair and the first one of the next pair. A comparator 12A, 12B, and 12C, 12D is associated with each pair to emit a binary output $+V$ or $-V$ (positive or negative) according to the algebraic sign of the difference between the responses of the cells of the corresponding pair. For instance comparator 12A will emit a positive output if the response of 11b is higher that that of 11a ( in other words it detects the sign of 11b - 11a), and so on. The outputs of comparators 12A-12D are applied to a summing circuit 13 which determines their algebraic sum, the latter forming the controlling signal 14 required.

The table of FIG. 5 shows the five possible states. When the level of the molten metal within the mould is correct, the output of circuit 13 is zero. When this level begins rising, the said output becomes $-2V$. If the correction is insufficient, it becomes $-4V$. In the same manner when the level sinks, the output signal from circuit 13 becomes $+2V$ and then $+4V$. It is obvious that with seven or nine cells the progressivity of the controlling signal would still be improved.

It is obvious that the binary output of each comparator 12A to 12D could also be 0 and 1, in which case the correct level would correspond to $1 + 1 = 2$ (or 10 under binary form), the higher levels to 1 and 0, and the lower ones to 3 and 4 (binary 11 and 100).

It is to be noted that with an uneven number of cells (as for instance five, as illustrated) there is an even number of comparators. On the contrary with an even number of cells the number of comparators is uneven, which means that the signal issuing from the summing circuit can never be zero. Theoritically this would result in an oscillating regulation of the level within the mould. But in actual practice with a large number of cells (as for instance ten), this oscillation is quite negligible and moreover it may be fully eliminated by making the regulating mechanism insensitive to the absolute value $2V$ of the controlling signal (or preferably only to the algebraic value $+2V$, since generally speaking a slight rising of the molten metal level within the mould has no detrimental effect on the casting process, while a too low level may lead to an insufficiently solidified bar at the lower end of the mould.

When the slag layer 7 is renewed by pouring a pulverulent product into the upper end of the mould 1, the upper surface 8 is covered by a cold screen and cells 11d, 11e only emit a quite feeble response of substantially equal intensity, as indicated in FIG. 6. The operation of comparator 12D (FIG. 4) thus becomes perturbed and it may therefore generate a wrong signal $+2V$ for a correct level (see the table of FIG. 5). But the screen effect above referred to disappears very rapidly, so that the risk of a defective regulation is practically eliminated, the regulating mechanism being generally rather slow in its action. Moreover it is easily possible to avoid any wrong output from comparator 12D by arranging it in such manner that it emits a negative output when it receives inputs below a predetermined threshold or of substantially equal intensities.

Another problem is the appearance of abnormally hot or cool points either on the slag layer or along the nozzle. For instance a particle of oxide may adhere to the periphery of the nozzle, or the pulverulent product introduced into the mould may form a layer of vastly non-uniform thickness which heats up irregularly. Such abnormally hot or cool points may of course alter the response of a cell. But if the number of the latter is sufficiently high (as for instance ten) the resulting error is of negligible importance.

Another means for deducing the controlling signal from the responses of the cells consists in also determining the gradients of their successive responses (as for instance with appropriate comparators, as above explained), in analyzing each one of all the possible combinations of the algebraic signs of these gradients to see if it corresponds to a correct, a too high or a too low level of the molten metal within the mould and in imparting to each an indicating number, as for instance $-1$ for a too high level, 0 for a correct level, $+1$ for a too low level. The said combinations and their indicating numbers may be memorized in an appropriate logic unit and in operation the said unit may receive the responses of the cells, determine therefrom the signs of the successive gradients, recognize the combination to which these signs correspond and emit the controlling signal in accordance with the indicating number of this combination.

This modified method is of particular interest with eight to ten cells.

I claim:

1. In a method for the automatic control of the level of a molten metal bath to maintain same at a proper height in continuous casting molds which are fed by an elongated refractory pouring nozzle having an axis which extends downwardly into the bath below a supernatant protective slag layer extending radially from the nozzle, an optical image of the upper portion of the said mold including the nozzle and the slag layer being formed at a location spaced from the mold and being directed onto temperature measuring means to obtain analogs varying in accordance with the position of the said level within the mold, the improvement comprising the steps of:

- measuring the temperatures at points disposed sequentially in spaced relationship in a line substantially lying along the axis of the image of said nozzle and along a radius of the slag layer image, in such manner that some of the temperatures are analog signals representing radiation at successive points along the periphery of said nozzle and others of the temperatures are analog signals representing radiation at successive points along the surface of said slag layer;
- comparing successive analog signals to determine temperature gradients wherein the direction of the gradients reverses at a zone where said line crosses the intersection of said images of the nozzle and the slag layer;
- selecting as the analog of the position of said level the zone of said line where said gradient reverses;
- and generating a controlling signal based on the position of said zone along said line.

2. The method as claimed in claim 1, comprising the further step of determining the directions of the gradients along said line by comparing the temperature analog signals at successive adjacent points to produce an algebraic sign representing the difference of said analog signals.

3. The method as claimed in claim 2, comprising the further steps of
- generating a binary number representing the result of each comparing of analog signals and indicative of the sign of said difference;
- and summing said numbers according to their signs to obtain said controlling signal.

4. The method as claimed in claim 2, comprising the further steps of representing the result of each comparing of analog signals by generating a number of constant absolute value with a sign corresponding to the sign of said difference, and summing algebraically said numbers to generate said controlling signal.

5. The method as claimed in claim 1, comprising the further steps of
- making an analysis of all the possible combinations of the directions of the signs of said analog signals representing the radiation gradients between the successive points along said line to determine whether each of said combinations corresponds to a correct level, to a too high level or a too low level of said molten metal bath within said mold;
- recording in a memory logic unit said combinations for each result of said analysis;
- comparing measured temperature gradients with said recorded combinations in said logic unit;
- and programming said logic unit to determine from said comparing of measured gradients the direction of the radiation gradient between the successive points along said line, and to recognize the combination to which the directions thus determined correspond, and to generate said controlling signal in accordance therewith.

6. An apparatus to generate a controlling signal adapted to achieve automatic control of a molten metal bath level within a continuous casting mold having an upper end into which the molten metal is fed through a refractory axially-elongated pouring nozzle which extends into said mold below a protective supernatant slag layer, and the mold having a lower end through which a solidified bar of the metal is withdrawn, said apparatus comprising:

- an optical instrument disposed above said mold and offset laterally with respect thereto with its axis at an angle to the vertical, the instrument being operative to form an optical image of the upper end of said mold including said pouring nozzle and said slag layer;
- a plurality of photo-electric cells disposed in a line lying substantially along the axis of the image of said nozzle, some of said cells intercepting the image of said nozzle and others of the cells intercepting the image of said layer;
- means connected to the cells for receiving analog signals from said cells proportional to the intensity of radiation to each cell, said means being operative for determining from said signals the direction of the gradient of said analog signals along said line;
- means connected to said receiving means to detect a zone along said line where said gradient reverses;
- and means connected to said detect means to generate said controlling signal in response to the position of said zone along said line.

7. In an apparatus as claimed in claim 6,
- said means for receiving the analog signals of said cells and determining from said signals the direction of the gradient of said signals along said line comprising comparators each receiving the responses of two successive ones of said cells and said comparators each delivering a binary output indicative of the sign of the algebraic difference between the two signals thus received;
- and said means to detect the zone of said line where said gradient reverses, and said means to generate said controlling signal from the position of said zone along said line comprising summing means to algebraically totalize the outputs from said comparators.

8. In an apparatus as claimed in claim 6, said means to detect the zone of said line where said radiation gradient reverses comprising comparators connected to receive signals from adjacent cells, and said means to generate said controlling signal from the position of said zone along said line comprising summing means to algebraically totalize the outputs from said comparators.

9. In an apparatus as claimed in claim 8, said comparators delivering an output having a predetermined absolute value with a sign corresponding to the sign of the difference between their input signals, and said cells being so disposed along said line that the total of the outputs of said comparators is equal to zero when the level of the molten metal bath within said mold is at a predetermined height.

* * * * *